United States Patent
Van Marion et al.

(10) Patent No.: US 7,579,551 B2
(45) Date of Patent: Aug. 25, 2009

(54) OUTER SHEATH LAYER FOR POWER OR COMMUNICATION CABLE

(75) Inventors: Remko Van Marion, Wien (AT); Roger Carlsson, Säve (SE); Hans Eklind, Stenungsund (SE); Irene Helland, Porsgrunn (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 11/917,441

(22) PCT Filed: Jun. 28, 2006

(86) PCT No.: PCT/EP2006/006267

§ 371 (c)(1),
(2), (4) Date: Apr. 28, 2008

(87) PCT Pub. No.: WO2007/003323

PCT Pub. Date: Jan. 11, 2007

(65) Prior Publication Data

US 2008/0196922 A1    Aug. 21, 2008

(30) Foreign Application Priority Data

Jun. 30, 2005   (EP)   .................................. 05014217

(51) Int. Cl.
    *H01B 7/00*   (2006.01)
(52) U.S. Cl. .............................. 174/110 R; 174/110 PM
(58) Field of Classification Search .................. 174/36, 174/110 R, 120 R, 120 AR, 120 SR; 428/847.2, 428/424.8; 523/500; 528/308.1
See application file for complete search history.

(56) References Cited

U.S. PATENT DOCUMENTS

| | | | |
|---|---|---|---|
| 5,718,974 A * | 2/1998 | Kmiec | 428/383 |
| 6,180,721 B1 * | 1/2001 | Rogestedt et al. | 525/191 |
| 6,185,349 B1 * | 2/2001 | Dammert et al. | 385/100 |
| 6,277,919 B1 * | 8/2001 | Dillon et al. | 525/199 |
| 6,329,054 B1 * | 12/2001 | Rogestedt et al. | 428/378 |
| 7,388,153 B2 * | 6/2008 | Wasserman et al. | 174/110 R |
| 2005/0054799 A1 | 3/2005 | Kuo et al. | |

FOREIGN PATENT DOCUMENTS

| | | |
|---|---|---|
| EP | 0 517 868 | 11/1995 |
| EP | 0 810 235 | 11/2004 |
| WO | WO 2000/22040 | 4/2000 |
| WO | WO 2004/055069 | 7/2004 |
| WO | WO 2004/101674 | 11/2004 |

OTHER PUBLICATIONS

International Search Report for International Application No. PCT/EP2006/006267.

* cited by examiner

*Primary Examiner*—William H Mayo, III
(74) *Attorney, Agent, or Firm*—Fay Sharpe LLP

(57) ABSTRACT

A power or communications cable having an outer sheath layer made of a polyethylene composition including a base resin which comprises (A) a first ethylene homo- or copolymer fraction, and (B) a second ethylene homo- or copolymer fraction, wherein fraction (A) has a lower molecular weight than fraction (B), and the base resin has a molecular weight distribution $M_w/M_n$ of more than 14.

21 Claims, 1 Drawing Sheet

Fig.1: Extruder pressure as a function of MFR 21
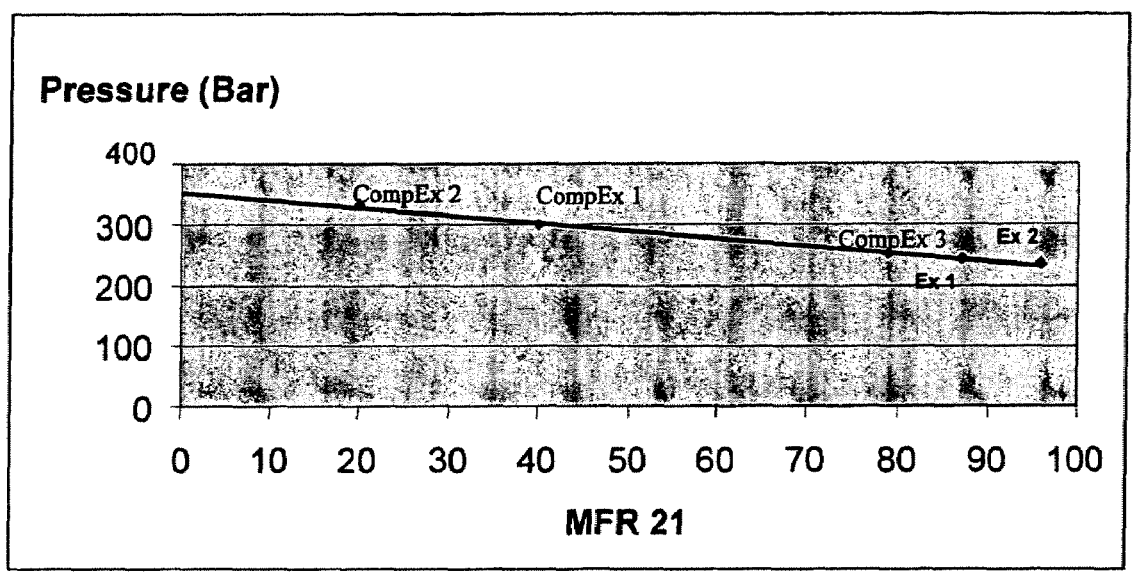

OUTER SHEATH LAYER FOR POWER OR COMMUNICATION CABLE

The present invention concerns a power or communication cable comprising an outer sheath layer made of a polyethylene composition which comprises a base resin comprising two ethylene homo- or copolymer fractions. Furthermore, the present invention relates to the use of such a composition for the production of the outer sheath layer of a cable.

BACKGROUND OF THE INVENTION

Cables, such as power or communication cables, usually comprise an inner core which comprises a conducting element, such as a metal wire or a glass fibre, and one or more outer layers for shielding and protecting purposes. The outermost of these layers having mainly protective purpose is usually referred to as outer sheath or outer jacket.

FIELD OF THE INVENTION

It is known to produce outermost protective sheath layers from polymer compositions comprising mainly polyolefins, in particular polyethylenes. The diverse application fields for the various kinds of cables make it necessary that the outer jacket meets a number of requirements which at least partly are contradictory to each other.

Among important properties of a cable jacket and a material used for production of a cable jacket are good processability, including good extrusion properties at a broad processing temperature window, and good mechanical properties, such as good resistance to environmental stress cracking ESCR, high mechanical strength, high surface finish and low shrinkage of the final cable jacket.

BRIEF DESCRIPTION OF THE INVENTION

It is accordingly an object of the present invention to provide a cable jacket made from a polyethylene composition having simultaneously the above-mentioned properties, with a high flexibility combined with all above mentioned properties. In particular, the composition used for the jacket should show an improved processability so that a high production rate can be achieved, while yielding a cable jacket with good surface properties.

The present invention is based on the finding that such a jacket can be provided if a polyethylene composition is used for its production which has a very broad molecular weight distribution of higher than 14.

The present invention thus provides a power or communications cable comprising an outer sheath layer made of a polyethylene composition comprising a base resin which comprises (A) a first ethylene homo- or copolymer fraction, and
(B) a second ethylene homo- or copolymer fraction, wherein fraction (A) has a lower molecular weight than fraction (B), and the base resin has a molecular weight distribution $M_w/M_n$ of more than 14.

The outermost sheath layer of the cable of the invention can be processed more easily as compared to prior art materials while retaining at the same time good mechanical properties, in particular good surface appearance.

The term "molecular weight" as used herein denotes the weight average molecular weight $M_w$. The melt flow rate MFR of a polymer may serve as a measure for the weight average molecular weight.

The term "base resin" means the entirety of polymeric components in the polyethylene composition used for the outer sheath layer of the cable according to the invention, usually making up at least 90 wt % of the total composition.

Usually, a polyethylene composition comprising at least two polyethylene fractions, which have been produced under different polymerisation conditions resulting in different (weight average) molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such a multimodal polyethylene will show two or more maxima or at least be distinctly broadened in comparison with the curves for the individual fractions.

For example, if a polymer is produced in a sequential multistage process, utilising reactors coupled in series and using different conditions in each reactor, or when a polymer is produced in a process comprising a single stage in which two or more different catalysts are used, the polymer fractions produced in the different reactors, or by the different catalysts, respectively, will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

In a preferred embodiment, the base resin has a molecular weight distribution $M_w/M_n$ of 23 or more, more preferably 25 or more, even more preferably 30 or more.

The base resin preferably has a $MFR_2$ of 0.05 to 5 g/10 min, more preferably of 0.1 to 4 g/10 min, still more preferably of 0.2 to 3.5 g/10 min and most preferably of 0.5 to 1.5 g/10 min.

Furthermore, the base resin preferably has a $MFR_{21}$ of 50 to 150 g/10 min, more preferably of 70 to 130 g/10 min. In a preferred embodiment, the base resin has a $MFR_{21}$ of at least 90 g/10 min.

The density of the base resin preferably is 0.915 to 0.960 g/cm³, more preferably is 0.918 to 0.950 g/cm³, still more preferably is 0.918 to 0.935 g/cm³, and most preferably is 0.918 to 0.928 g/cm³.

The base resin preferably has a flow rate ratio FRR of 50 to 150, more preferably of 80 to 130.

Fraction (A) of the base resin preferably has a $MFR_2$ of 50 to 5000 g/10 min, more preferably of 100 to 1000 g/10 min, and most preferably of 200 to 700 g/10 min.

Further, fraction (A) preferably has a density of 0.930 to 0.975 g/cm³, more preferably of 0.935 to 0.955 g/cm³.

Still further, fraction (A) preferably is an ethylene copolymer with at least one further alpha-olefin.

Preferably, the alpha-olefin comonomer of fraction (B) is having from 3 to 20 carbon atoms, more preferably 4 to 10 carbon atoms, and most preferably is selected from 1-butene, 1-hexene, 4-methyl-1-pentene, 1-octene and 1-decadene.

Further preferred, the weight average molecular weight of fraction (A) is from 5,000 g/mol to 100,000 g/mol, more preferably is from 7,000 to 90,000 g/mol, and most preferably is from 10,000 to 80,000 g/mol.

Fraction (B) of the base resin preferably has a $MFR_2$ of 0.01 to 1 g/10 min, more preferably of 0.05 to 0.3 g/10 min.

Further, fraction (B) preferably has a density of 0.880 to 0.930 g/cm³, more preferably has a density of 0.890 to 0.920 g/cm³.

Still further, fraction (B) preferably is a copolymer of ethylene with at least one further alpha-olefin.

Preferably, the alpha-olefin comonomer of fraction (B) is having from 3 to 12 carbon atoms, more preferably 4 to 8 carbon atoms, and most preferably is selected from 1-butene, 1-hexene, 4-methyl-1-pentene and 1-octene.

In a particularly preferred embodiment, the base resin further comprises (C) a third ethylene homo- or copolymer fraction in an amount of up to 20 wt % of the total base resin with a $MFR_2$ of 0.1 g/10 min or lower.

Preferably, the amount of fraction (C) is up to 15 wt %, more preferably up to 10 wt % of the total base resin. In a preferred embodiment, fraction (C) is present in the base resin in an amount of 1 wt % to 5 wt %.

Further, preferably fraction (C) is present in the base resin in an amount of at least 2 wt %, more preferably of at least 3 wt %.

Preferably, fraction (C) has a $MFR_{21}$ of less than 1 g/10 min.

Fraction (C) preferably is an ethylene homopolymer.

Fraction (C) is preferably made in a previous step from (A) and (B) and fraction (C) has a higher MW than fraction (B).

The weight ratio of fractions (A):(B) in the base resin preferably is 30:70 to 70:30, more preferably 40:60 to 60:40, even more preferably 45:55 to 55:45.

The base resin preferably has a density of lower than 960 kg/m$^3$.

The weight average molecular weight of the base resin preferably is from 100,000 g/mol to 2,000,000 g/mol.

In a preferred embodiment, the base resin consists of fraction (A), (B) and (C).

In addition to the base resin, usual additives for utilization with polyolefins, such as pigments (for example carbon black), stabilizers (antioxidant agents), antacids and/or anti-UVs, antistatic agents and utilization agents (such as processing aid agents) may be present in the polyethylene composition. The additives can be added as a polyolefin masterbatch. Preferably, the amount of these additives is 10 wt % or below, further preferred 8 wt % or below, of the total composition.

The polyethylene composition of the cable according to the invention preferably has a shear thinning index $SHI_{(2.7/210)}$ of at least 5, more preferably at least 10, still more preferably at least 20 and most preferably at least 40.

Furthermore, the polyethylene composition preferably has a shear thinning index $SHI_{(2.7/210)}$ of 300 or less, more preferably 290 or less, still more preferably 220 or less and most preferably 200 or less.

The SHI is the ratio of the viscosity of the polyethylene composition at different shear stresses. In the present invention, the shear stresses at 2.7 kPa and 210 kPa are used for calculating the $SHI_{2.7/210}$ which may serve as a measure of the broadness of the molecular weight distribution.

Furthermore, the polyethylene composition preferably has a viscosity at a shear stress of 2.7 kPa $\eta_{(2.7)}$ of 10,000 to 500,000 Pas, more preferably of 50,000 to 400,000 Pas, and most preferably of 75,000 to 350,000 Pas.

The base resin of the polymer composition used for making the outermost sheath layer of the cable of the invention may be produced by any process known in the art.

It is preferred, however, that the base resin is a so-called in-situ blend of its constituents. By "in-situ blend", a multimodal polymer is meant which fractions are produced either simultaneously in one reaction stage (e.g. by using two or more different catalysts), and/or are produced in a multistage process. A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst. The polymer can be recirculated to any stage or reactor.

Where herein preferred features of fractions (A) and/or (B) of the composition of the present invention are given, these values are generally valid for the cases in which they can be directly measured on the respective fraction, e.g. when the fraction is separately produced or produced in the first stage of a multistage process.

However, the base resin may also be and preferably is produced in a multistage process wherein e.g. fractions (A) and (B) are produced in subsequent stages. In such a case, the properties of the fractions produced in the second and third step (or further steps) of the multistage process can either be inferred from polymers, which are separately produced in a single stage by applying identical polymerisation conditions (e.g. identical temperature, partial pressures of the reactants/diluents, suspension medium, reaction time) with regard to the stage of the multistage process in which the fraction is produced, and by using a catalyst on which no previously produced polymer is present. Alternatively, the properties of the fractions produced in a higher stage of the multistage process may also be calculated, e.g. in accordance with B. Hagström, Conference on Polymer Processing (The Polymer Processing Society), Extended Abstracts and Final Programme, Gothenburg, Aug. 19 to 21, 1997, 4:13.

Thus, although not directly measurable on the multistage process products, the properties of the fractions produced in higher stages of such a multistage process can be determined by applying either or both of the above methods. The skilled person will be able to select the appropriate method.

The base resin of the cable according to the invention preferably is produced so that at least one of fractions (A) and (B), preferably (B), is produced in a gas-phase reaction.

Further preferred, one of the fractions (A) and (B) of the polyethylene composition, preferably fraction (A), is produced in a slurry reaction, preferably in a loop reactor, and one of the fractions (A) and (B), preferably fraction (B), is produced in a gas-phase reaction.

It is furthermore preferred that fraction (A) and (B) of the polyethylene composition are produced in different stages of a multistage process.

Preferably, the multistage process comprises at least one gas phase stage in which, preferably, fraction (B) is produced.

Further preferred, fraction (B) is produced in a subsequent stage in the presence of fraction (A) which has been produced in a previous stage.

It is previously known to produce multimodal, in particular bimodal, olefin polymers, such as multimodal polyethylene, in a multistage process comprising two or more reactors connected in series. As an example of this prior art, mention may be made of EP 517 868, which is hereby incorporated by way of reference in its entirety, including all its preferred embodiments as described therein, as a preferred multistage process for the production of the polyethylene composition of the cable according to the invention.

Preferably, the main polymerisation stages of the multistage process are such as described in EP 517 868, i.e. the production of fractions (A) and (B) is carried out as a combination of slurry polymerisation for fraction (A)/gas-phase polymerisation for fraction (B). The slurry polymerisation is preferably performed in a so-called loop reactor. Further preferred, the slurry polymerisation stage precedes the gas phase stage.

In a preferred embodiment, fraction (C) is also produced in the multistage process in which fractions (A) and (B) are produced. Preferably, fraction (C) is produced in a so-called prepolymerisation step, preceding the production of further fractions of the base resin. As mentioned, the prepolymer is preferably an ethylene homopolymer (HDPE).

Preferably, in the prepolymerisation step, all of the catalyst is charged into a loop reactor and the prepolymerisation is performed as a slurry polymerisation. Such a prepolymerisation leads to less fine particles being produced in the following reactors and to a more homogeneous product being obtained in the end.

In the production of the base resin, Ziegler-Natta (ZN) or metallocene catalysts are preferably used, more preferably Ziegler-Natta catalysts.

The catalyst may be supported, e.g. with conventional supports including silica, Al-containing supports and magnesium dichloride based supports. Preferably the catalyst is a ZN catalyst, more preferably the catalyst is non-silica supported ZN catalyst, and most preferably $MgCl_2$-based ZN catalyst.

The Ziegler-Natta catalyst further preferably comprises a group 4 (group numbering according to new IUPAC system) metal compound, preferably titanium, magnesium dichloride and aluminium.

The catalyst may be commercially available or be produced in accordance or analogously to the literature. For the preparation of the preferable catalyst usable in the invention reference is made to WO2004055068 and WO2004055069 of Borealis and EP 0 810 235. The content of these documents in its entirety is incorporated herein by reference, in particular concerning the general and all preferred embodiments of the catalysts described therein as well as the methods for the production of the catalysts.

Preferably, the polymerisation conditions in the preferred multistage method are so chosen that, owing to a high content of chain-transfer agent (hydrogen gas), the comparatively low-molecular polymer is produced in a stage preceding the stage in which the high-molecular polymer is produced. The order of these stages may, however, be reversed.

In the preferred embodiment of the polymerisation of fraction (A) in a loop reactor followed by production of fraction (B) in a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 200 to 800 moles of $H_2$/kmoles of ethylene are added to the reactor, when the LMW fraction is produced in this reactor, and 0 to 50 moles of $H_2$/kmoles of ethylene are added to the gas phase reactor when this reactor is producing the HMW fraction.

If a prepolymerisation step is used in which fraction (C) is produced it is preferred that no hydrogen at all is introduced into the reactor during this step. We need to open up for allowing small addition of hydrogen.

The composition for the outer sheath layer of the cable of the invention preferably is produced in a process comprising a compounding step, wherein the composition of the base resin, i.e. the blend, which is typically obtained as a base resin powder from the reactor, is extruded in an extruder and then pelletised to polymer pellets in a manner known in the art.

Optionally, additives or other polymer components can be added to the composition during the compounding step in the amount as described above. Preferably, the composition of the invention obtained from the reactor is compounded in the extruder together with additives in a manner known in the art.

The extruder may be e.g. any conventionally used extruder. As an example of an extruder for the present compounding step may be those as supplied by Japan steel works, Kobe steel or Farrel-Pomini, e.g. JSW 460P.

The cables of the invention in addition to the outermost sheath layer comprise at least one or more power or information conducting elements. The cable comprising the outer sheath layer may be produced . . . .

As indicated in the foregoing, the cable sheathing composition can be used for producing outer sheath layers for cables, including power cables as well as communication cables. Amongst power cables, mention may be made of high-voltage cables, medium voltage cables, and low voltage cables. Amongst communication cables, mention may be made of pair cables, coaxial cables and optical cables.

EXAMPLES

Measuring Methods a) Molecular Weight/Molecular Weight Distribution

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-4:2003. A waters 150 CV plus instrument was used with column 3×HT&E styragel from Waters (divinylbenzene) and trichlorobenzene (TCB) as solvent at 140° C. The column set was calibrated using universal calibration with narrow MWD PS standards (the Mark Howings constant K: $9.54*10^{-5}$ and a: 0.725 for PS, and K: $3.92*10^{-4}$ and a: 0.725 for PE). The ratio of $M_w$ and $M_n$ is a measure of the broadness of the distribution, since each is influenced by the opposite end of the "population".

b) Density

Density is measured according to ISO 1872, Annex A.

c) Melt Flow Rate/Flow Rate Ratio

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 190° C. and may be determined at different loadings such as 2.16 kg ($MFR_2$), 5 kg ($MFR_5$) or 21.6 kg ($MFR_{21}$).

The quantity FRR (flow rate ratio) is an indication of molecular weight distribution and denotes the ratio of flow rates at different loadings. Thus, $FRR_{21/2}$ denotes the value of $MFR_{21}/MFR_2$.

d) Rheological Parameters

Rheological parameters such as Shear Thinning Index SHI and Viscosity are determined by using a rheometer, preferably a Rheometrics Phisica MCR 300 Rheometer. The definition and measurement conditions are described in detail on page 8 line 29 to page 1, line 25 of WO 00/22040.

e) Environmental Stress Cracking Resistance (ESCR)

ESCR was evaluated according to CTL: ISO 6259, with a notch applied according to ASTM F1473, using CTL with different constant stress of 2, 3 and 4 MPa. A 10% Igepal solution was used as medium.

f) Cable Samples for the Evaluation are Extruded as Follows.

| | |
|---|---|
| Conductor | 3.0 mm Solid Al conductor |
| Wall thickness | 1.0 mm |
| Temperature, die | +210° C. |
| Distance between die and waterbath | 35 cm |
| Temperature, water bath | +23° C. |
| Line velocity | 75 m/min |
| Die type | Semi-tube |
| Nipple | 3.65 mm |
| Die | 5.9 mm |
| Screw design | Elise | g) Shrinkage

The shrinkage in percent is measured after 24 h in constant temperature (+23° C.) as well as after 24 h at a temperature of +100° C. Cable samples measuring approximately 40 cm are measured. Conveniently, the samples is so marked that the measurement after the conditioning can be carried out at the same point on the cable sample.

Should the sample be found to shrink during measurement, marks of about 40 cm first have to be made. Then the length is cut and remeasured. Double samples are taken of each cable that is to be analysed. The samples are placed in the room with constant temperature for 24 h, whereupon they are measured, and shrinkage value in percent are calculated. All the samples are then placed on a talcum bed at 100° C. for 24 h. The samples are measured, and the total shrinkage in percent is calculated on the basis of the initial length.

h) Filler Absorption

Filler absorption was measured according to BTM22511 on plaques, quenched in cool water.

i) Mechanical Properties

Elongation at break and tensile strength at break were measured according to 22542/ISO 527-2/1A,B, either on plaques or on cables having a jacket of 1 mm in thickness applied on a 3 mm in diameter aluminium conductor.

j) Heat Deformation

This was tested according to EN 60811-3-1:1995. This was tested on cables 3 mm core and 1 mm jacketing layer extruded directly on the conductor. This property is directly proportional to the density. In this test we have used cool waterbath during extrusion, therefore reproducing the worst case. When the molten plastics meet cold water the density is lower than if the crystallization takes place during slow cooling, see table for results. The indention at 115° C. after 4 h is recorded and reported as how many % the egg is penetrating the sample thickness.

Tested Compositions

Examples 1-5

Two polyethylene compositions according to the present invention (Ex1 and Ex2) and three comparative polyethylene compositions have been prepared (CompEx 1-3). All compositions are bimodal. Further information about each composition is given below:

TABLE 1

Properties of Ex 1-2 and CompEx 1-2

| | Ex. 1 | Ex. 2 | CompEx 1 | CompEx 2 |
|---|---|---|---|---|
| Density (kg/cm$^3$) | 921.8 | 924.4 | 923 | 923 |
| MFR2 (g/10 min) | 0.87 | 0.81 | 0.4 | 0.2 |
| MFR21 (g/10 min) | 87 | 96 | 40 | 22 |
| FRR21/2 | 100 | 118 | 100 | 110 |
| Loop | | | | |
| Temperature (° C.) | 85 | 85 | | |
| Pressure (bar) | 60 | 60 | | |
| H2/C2 ratio (mol/kmol) | 282 | 275 | 330 | 350 |
| C4/C2 ratio (mol/kmol) | 147 | 142 | 670 | 630 |
| MFR2 (g/10 min) | 520 | 520 | 300 | 300 |
| Density (kg/cm$^3$) | 952 | 951 | 951 | 945 |
| Split | 50 | 54 | 43 | 42 |
| Gasphase | | | | |
| Temperature (° C.) | 80 | 80 | | |
| Pressure (bar) | 20 | 20 | | |
| H2/C2 ratio (mol/kmol) | 8 | 8 | 10 | 3 |
| C4/C2 ratio (mol/kmol) | 747 | 695 | 650 | 600 |
| MFR2 (g/10 min) | 0.85 | 0.7-1 | | |
| Density (kg/cm$^3$) | 892 | 893 | 901 | 907 |
| Split | 50 | 46 | 57 | 58 |

As additives, 2400 ppm Irganox B225 and 1500 ppm calcium stearate have been used. The catalyst used in Ex 1-2 and CompEx 1-2 is a Ziegler-Natta type catalyst which corresponds to the one used in EP 6887794, Example 3.

TABLE 2

Molecular weight and molecular weight distribution of Ex 1-2

| | Ex 1 | Ex 2 |
|---|---|---|
| Mw | 149000 | 139000 |
| Mn | 9040 | 8070 |
| Mz | 845000 | 796000 |
| MWD | 16.5 | 17.3 |

In Ex 1 and 2, the melt flow rate MFR$_{21.6kg/190° C.}$ is significantly higher than in the comparative examples. Furthermore, as indicated by FRR21/2 and MWD values, the inventive examples have a broad molecular weight distribution.

CompEx 3 is a linear low density polyethylene (LLDPE) including 15 wt % low density polyethylene to improve processability. Properties of the blend are given in Table 3:

TABLE 3

Properties of CompEx 3

| | Comp. Ex. 3 |
|---|---|
| Density (g/cm$^3$) | 0.920 |
| MFR2 (g/10 min) | 0.8 |
| MFR21 (g/10 min) | 79 |
| FRR$_{21/2}$ | 65 |

In the following, relevant processing properties and mechanical properties of these compositions will be provided and discussed.

Processability

As already discussed above, the processability of a jacketing material includes several parameters e.g. surface finish, output, melt pressure, and extruder motor power. It is important that the processing window is wide since there are many different applications for a jacketing material.

To evaluate the processability, the compositions were extruded at a cable line. 1 mm thick jacket were applied on a 3 mm in diameter aluminum conductor. To stress the material in terms of shrinkage performance the temperature setting was not optimal. The conductor was not preheated, the melt temperature was 210° C. and the cooling bath temperature was 23° C. The line speed was 75 m/min.

Surface Finish

Surface finish was evaluated by visual and hands on inspection.

Previous experience is that the lower the MFR the better is the surface finish. However, all cables produced showed a very smooth surface which is quite surprising considering the high MR21 values chosen for Ex 1-2.

BRIEF DESCRIPTION OF THE DRAWING

FIG. 1 illustrates the effect of $MFR_{21.6 kg/190° C.}$ on extruder pressure

DETAILED DESCRIPTION OF THE DRAWING

Output and Melt Pressure

In Table 4, data from the cable line extrusion test are shown.

TABLE 4

Cable line extrusion test

|  | Ex 1 | Ex 2 | CompEx 2 | CompEx 1 | CompEx 3 |
|---|---|---|---|---|---|
| Filter pressure (Bar) | 243 | 235 | 332 | 300 | 255 |
| RPM | 61 | 61 | 65 | 59 | 58 |
| Extruder power (amps) | 55 | 55 | 67 | 65 | 62 |

The results of Table 4 clearly indicate that the inventive compositions can be extruded at lower pressure and extruder power.

The effect of $MFR_{21.6kg/190° C.}$ on extruder pressure is also shown in FIG. 1. Due to the lower MFR21, CompEx 1-2 need a much higher extruder pressure to have the same output. By blending LDPE and LLDPE (i.e. CompEx 3), it is possible to have an extruder pressure comparable the one of Ex 1-2. However, adding LDPE adversely affects mechanical properties, heat deformation and shrinkage behaviour, as will be shown below.

Environmental Stress Cracking Resistance (ESCR)

The environmental stress cracking was evaluated using CTL with different constant stress. A 10% igepal solution was used as medium. The results are shown in table 5.

TABLE 5

ESCR results

|  | Ex 1 | Ex 2 | CompEx 1 | CompEx 2 | CompEx 3 |
|---|---|---|---|---|---|
| CTL 2 MPa (h) |  |  |  |  |  |
| CTL 3 MPa (h) | >3500 | >3500 | >3500 | >3500 | 55.25 |
| CTL 4 MPa (h) | >3500 | >3500 | >3500 | >3500 | 30.35 |
| ESCR bell test (F0h) | >2000 | >2000 |  |  | >2000 |

Mechanical Properties

Elongation at break and tensile strength are summarized in Table 6. The results demonstrate that the inventive examples have good mechanical properties. In other words, processability has been improved while keeping mechanical properties on a high level.

TABLE 6

Data about mechanical properties

|  | Ex 1 | Ex 2 | CompEx 2 | CompEx 1 | CompEx 3 |
|---|---|---|---|---|---|
| Elongation at break (%) | 711 | 703 | 661 | 804 | 829 |
| Tensile strength at break (MPa) | 26.1 | 25.8 | 30.5 | 31.8 | 22.0 |

Shrinkage

Shrinkage values are listed in Table 7.

TABLE 7

Shrinkage behaviour

|  | Ex 1 | Ex 2 | CompEx 2 | CompEx 1 | CompEx 3 |
|---|---|---|---|---|---|
| Shrinkage 24 h 23° C. (%) | 0.04 | 0.04 | 0.05 | 0.00 | 0.24 |
| Shrinkage 24 h 100° C. (%) | 0.08 | 0.13 | 0.19 | 0.18 | 0.92 |

The data of Table 7 indicate that the compositions of the present invention show low shrinkage. In particular, it is evident that the improvement in processability of CompEx 3 (e.g. low extrusion pressure) adversely affects shrinkage behaviour.

Compatibility with Filling Compounds

The main application for LD and LLD jackets is in telecommunication cables. In many telecables, copper or fiber optical, filling compounds are used to protect them from water intrusion. A petroleum jelly based, Insojell 3332, is commonly used in copper cables. This filling compound is normally the filling compound that gives the highest absorption.

Two tests are performed, weight increase and the influence on the mechanical properties.

Dumbbells 2 mm thick from pressed plaques were put in Insojell 3332 for 7 days. The samples were put on aluminum rods to enable free access for the petroleum jelly from all sides. The ageing was done at 60° C. For the results see table 9.

TABLE 9

Influence of petroleum jelly

|  | Ex 1 | Ex 2 | CompEx 2 | CompEx 1 | CompEx 3 |
|---|---|---|---|---|---|
| Weight increase (%) | 14.5 | 12.2 | 10.5 | 9.0 | 7.9 |
| Tensile strength at break (MPa) | 20.7 | 21.4 | 25.4 | 25.7 | 16.4 |
| Change in tensile strength (%) | −8.0 | 5 | −23.3 | −20.5 | −11.4 |
| Elongation at break (%) | 717 | 778 | 639 | 736 | 756 |
| Change in elongation (%) | −19.2 | −14.8 | −22.0 | −13.9 | −10.7 |

Examples 6-13

In these examples, three polyethylene compositions according to the present invention (Ex 3-5) and five reference materials (CompEx 4-8) have been prepared.

The inventive examples were prepared in a sequential multistage process including a prepolymerization step, followed by polymerization in a loop reactor and subsequently in a gas phase reactor. Thus, the final composition included three polymer fractions.

As a catalyst for the examples 3-5, a commercial Lynx 200™ catalyst as manufactured and supplied by Engelhard Corporation has been used Just like the inventive examples, CompEx 4-5 have been prepared in a sequential multistage process. However, in contrast to Ex 3-5, no prepolymerization step was included. Thus, CompEx 4-5 are bimodal.

CompEx 4 is based on CompEx 1. However, low density polyethylene was added.

CompEx 5 corresponds to CompEx 1.

CompEx 6-7 are both based on linear low density polyethylene to which low density polyethylene has been added to improve processability.

CompEx 8 has been prepared in a two-step process, the first step being carried out in a loop reactor, followed by a gas phase polymerization step.

Further information about these compositions is provided in Table 10.

TABLE 10

Process conditions and properties for Ex 3-5

| sample | | Ex 3 | Ex 4 | Ex 5 |
|---|---|---|---|---|
| PREPOLYMERISATION REACTOR | | | | |
| temperature | ° C. | 60 | 60 | 60 |
| pressure | bar | 61 | 60 | 61 |
| catalyst feed | g/h | 1.4 | 1.4 | 2.3 |
| cocatalyst feed | g/h | 5.0 | 5.0 | 5.0 |
| antistatic feed | ppm | 7 | 7 | 7 |
| $C_2$ feed | kg/h | 1.9 | 1.7 | 2.0 |
| $H_2$ feed | g/h | | 0.6 | |
| $C_4$ feed | g/h | | | |
| $C_6$ feed | g/h | | | |
| $C_3$ feed | kg/h | 36.8 | 35.7 | 38.7 |
| split | wt-% | 2.7 | 2.5 | 3.0 |
| run stability | | good | good | good |
| MFR2 | g/(10 min) | | | |
| density | kg/cum | | | |
| ash content | ppm | | | |
| LOOP REACTOR | | | | |
| temperature | ° C. | 80 | 80 | 80 |
| pressure | bar | 56 | 56 | 56 |
| catalyst feed | g/h | 1.4 | 1.4 | 2.3 |
| cocatalyst feed | g/h | | | |
| $C_2$ feed | kg/h | 32.9 | 33.0 | 31.7 |
| $H_2$ feed | g/h | | | |
| $C_4$ feed | g/h | | | |
| $C_3$ feed | kg/h | 80.2 | 93.7 | 88.7 |
| $C_2$ concentration | mol % | 3.9 | 4.5 | 4.3 |
| $H_2/C_2$ ratio | mol/kmol | 399 | 360 | 390 |
| $C_4/C_2$ ratio | mol/kmol | 469 | 388 | 421 |
| $C_6/C_2$ ratio | mol/kmol | | | |
| $C_4/C_6$ feed ratio | g/kg | | | |
| ethane concentration | mol % | 0.23 | 0.17 | 0.19 |
| production rate | kg/h | 32 | 31 | 30 |
| productivity | kg/g | 23 | 22 | 13 |
| split | wt-% | 50.9 | 51.6 | 51.5 |
| run stability | | good | fair | good |
| MFR2 | g/(10 min) | 350 | 300 | 350 |
| density | kg/cum | 944 | 947 | 946 |
| bulk density | kg/cum | 367 | 374 | 390 |
| ash content | ppm | 100 | 150 | |
| US200 | wt-% | 7.2 | 13.4 | 10.5 |
| pan | wt-% | 10.8 | 14.0 | 11.2 |
| fines (<106 μm) | wt-% | 18.0 | 27.4 | 21.7 |
| APS | mm | 0.22 | 0.18 | 0.21 |
| comonomer | | 1-butene | 1-butene | 1-butene |
| GAS PHASE REACTOR | | | | |
| temperature | ° C. | 80 | 80 | 80 |
| pressure | bar | 20 | 20 | 20 |
| $C_2$ feed | kg/h | 35 | 38 | 34 |
| $H_2$ feed | g/h | 10.2 | 11.0 | 10.1 |
| $C_4$ feed | kg/h | 9.6 | 12.2 | 10.8 |
| $C_6$ feed | kg/h | | | |
| $C_2$ concentration | mol % | 11 | 12 | 11 |
| $C_2$ partial pressure | bar | 2.2 | 2.4 | 2.2 |
| $H_2/C_2$ ratio | mol/kmol | 34 | 29 | 31 |
| $C_4/C_2$ ratio | mol/kmol | 403 | 455 | 450 |
| $C_6/C_2$ ratio | mol/kmol | | | |
| $C_4/C_6$ feed ratio | g/kg | 270 | 324 | 321 |
| ethane concentration | mol % | 0.03 | 0.03 | 0.03 |
| production rate | kg/h | 30.5 | 29.3 | 28.8 |
| productivity (overall) | kg/g | 45 | 42 | 25 |
| split | wt-% | 49.1 | 48.4 | 48.5 |
| run stability | | fair | good | good |
| MFR2 | g/(10 min) | 0.8 | 0.9 | 1.0 |
| MFR21 | g/(10 min) | 87 | 94 | 106 |
| FRR21/2 | — | 104 | 106 | 106 |
| density | kg/cum | 926 | 927 | 925 |
| calculated density (HMW fraction) | kg/cum | 907 | 906 | 903 |
| bulk density | kg/cum | 404 | 395 | 397 |
| US200 | wt-% | 3.5 | | 5.5 |
| pan | wt-% | 2.3 | | 3.4 |
| fines (<106 μm) | wt-% | 5.8 | | 8.9 |
| APS | mm | 0.3 | | 0.3 |
| comonomer | | 1-butene | 1-butene | 1-butene |
| EXTRUDER | | | | |
| feed | kg/hr | 221 | 221 | 221 |
| screw speed | rpm | 400 | 400 | 400 |
| throttle valve position | degrees | 12 | 12 | 12 |
| SEI | kWh/t | 260 | 271 | 260 |
| melt temperature | ° C. | 215.4 | 220.4 | 216.6 |
| pellet quantity | kg | 358 | 400 | 550 |
| MFR2 | g/(10 min) | 0.8 | 0.9 | 1.0 |
| MFR5 | g/(10 min) | 3.40 | 3.90 | 4.50 |
| MFR21 | g/(10 min) | 90.0 | 102.0 | 111.0 |
| FRR21/2 | — | 114 | 115 | 111 |
| MWD | — | 31.6 | 32.0 | 32.3 |
| density | kg/cum | 926.3 | 928.3 | 926.8 |
| ash content | ppm | 210 | 230 | 280 |
| irganox B225 | ppm | 2640 | 2650 | 2690 |
| irganox B561 | ppm | | | |
| irganox 1076 | ppm | | | |
| 168/XR | ppm | | | |
| carbon black | wt-% | | | |
| Cast | ppm | 1580 | 1580 | 1590 |
| CaZnst | ppm | | | |
| Znst | ppm | | | |
| Yl/3 mm | — | | −8.0 | −8.3 |
| Gel.2- | n/sqm | | | |
| Gel.4- | n/sqm | | | |
| Gel.7- | n/sqm | | | |
| WS dispersion | — | | | |
| CB disperion | — | | | |

TABLE 11

Properties of reference materials

|  | CompEx 4 | CompEx 5 | CompEx 6 | CompEx 7 | CompEx 8 |
|---|---|---|---|---|---|
| Density (kg/cm³) | 925 | 923 | 931 | 920 | 921.5 |
| MFR2 (g/10 min) | 0.4 | 0.4 | 0.7 | 0.8 | 0.7 |
| MFR21 (g/10 min) |  | 40 | 79 | 79 | 46 |
| FRR21/2 |  | 100 | 65 | 65 | 68 |
| Loop |  |  |  |  |  |
| Temperature |  |  |  |  | 85 |
| Pressure |  |  |  |  | 57 |
| H2/C2 ratio |  | 330 |  |  | 202 |
| C4/C2 ratio |  | 670 |  |  | 609 |
| MFR2 (g/10 min) |  | 300 |  |  | 290 |
| Density (kg/cm³) |  | 951 |  |  | 950 |
| Split |  | 43 |  |  | 43.5 |
| Gasphase |  |  |  |  |  |
| Temperature |  |  |  |  | 80 |
| Pressure |  |  |  |  | 20 |
| H2/C2 ratio |  | 10 |  |  | 4.4 |
| C4/C2 ratio |  | 650 |  |  | 619 |
| MFR2 (g/10 min) |  |  |  |  | 0.7 |
| Density (kg/cm³) |  | 901 |  |  | 897 |
| Split |  | 57 |  |  | 56.5 |

Comparative example 4 is the same as comparative example 5 but with 15% LDPE compounded.

In Table 12, molecular weight and molecular weight distribution of Ex 3-5 and CompEx 5 and 8 are summarized. From Table 12, it is evident that the presence of a third fraction in the inventive compositions significantly broadens the molecular weight distribution, if compared to the reference materials.

TABLE 12

Molecular weight and molecular weight distribution

|  | Ex 3 | Ex 4 | Ex 5 | CompEx 8 | CompEx 5 |
|---|---|---|---|---|---|
| Mw | 136000 | 143000 | 136000 | 143000 | 185000 |
| Mn | 4330 | 4480 | 4220 | 10100 | 15000 |
| Mz | 808000 | 940000 | 901000 | 612000 |  |
| MWD | 31.6 | 32 | 32.3 | 14.2 | 12.3 |

In Table 13, the shear thinning index SHI(2.7/210) of Ex 3-5 and CompEx 8 is given.

TABLE 13

Shear thinning index

| Product | SHI(2.7/210) |
|---|---|
| Ex 3 | 65 |
| Ex 4 | 60 |
| Ex 5 | 58 |
| CompEx 4 | 41 |
| CompEx 5 | 35 |
| CompEx 6 | 50 |
| CompEx 8 | 25 |

As shown in Table 13, the inventive compositions have high shear thinning index, significantly exceeding the value of the reference material. As already discussed above, high SHI values indicate a broad molecular weight distribution. The compositions have been subjected to tests for processability and mechanical properties. The results are shown and discussed below.

Surface Finish

Surface finish was evaluated by visual and hands on inspection. Two different phenomena were observed, first the surface finish as such but also the shape of the insulation. At higher line speed a wave shape occurred at some of the materials. The former are due to the melt strength and the second is more due to extruder pumping and could possibly be corrected by increased melt temperature. However it indicates a more narrow processing window. Previous experience is that the lower the MFR the better is the surface finish. Although the inventive compositions have much higher MFR, they provide excellent results at these line speeds.

TABLE 14

Evaluation of surface properties

|  | Line speed | Ex 3 | Ex 4 | Ex. 5 A2047 | CompEx 8 | CompEx 6 | CompEx 5 | CompEx 4 |
|---|---|---|---|---|---|---|---|---|
| Surface smoothness 0-4 (4 is best) | 15 | 3 | 3 | 4 | 4 | 3 | 3 | 4 |
|  | 35 | 4 | 4 | 4 | 4 | 4 | 4 | 4 |
|  | 70 | 4 | 4 | 4 | 4 | 4 | 4 | 4 |
|  | 140 | 4 | 4 | 4 | 4 | 4 | 4 | 4 |
| Waviness 1-4 (4 is best) | 15 | 4 | 4 | 4 | 4 | 4 | 4 | 4 |
|  | 35 | 4 | 4 | 4 | 4 | 4 | 4 | 4 |
|  | 70 | 4 | 4 | 4 | 4 | 4 | 4 | 4 |
|  | 140 | 4 | 4 | 4 | 3 | 3 | 2 | 2 |
| Over all performance compared to CompEx 6 |  | =/+ | =/+ | +/+ | +/= |  | =/− | +/− |

Melt Pressure

Just like Ex 1-2, the inventive examples 3-5 have low melt pressure at a specific line speed. With CompEx 6-7 (i.e. blends of LLDPE and LDPE), a low melt tension can be obtained as well. However, as will be shown below, in these materials low-melt tension adversely affects tensile strength, heat deformation and shrinkage behaviour.

In CompEx 4, 5 and 8, melt tension is significantly higher. Melt tension as a function of line speed is shown in FIG. 2.

Mechanical Properties

Mechanical properties are summarized in Tables 15 and 16.

TABLE 15

Mechanical properties measured on plaques

| Plaques | Ex 3 | Ex 4 | Ex 5 | CompEx 8 | CompEx 4 | CompEx 5 | CompEx 6 |
|---|---|---|---|---|---|---|---|
| Elongation at break (%) | 904 | 907 | 937 | 837 | 808 | 824.9 | 810 |
| Tensile strength at break (MPa) | 26.3 | 28.7 | 28.5 | 33.1 | 31.7 | 32.5 | 19.5 |

The data of Table 15 show that the inventive examples have good mechanical properties. In particular, when comparing Ex 3-5 with CompEx 6 it is evident that only the inventive examples have an improved balance between processability (e.g. low melt pressure) and mechanical properties.

TABLE 16

Mechanical properties measured on cables

| Cables | Ex 3 | Ex 4 | Ex 5 | CompEx 8 | CompEx 4 | CompEx 5 | CompEx 6 |
|---|---|---|---|---|---|---|---|
| Elongation at break (%) | 597 | 631 | 620 | 576 | 500 | 551 | 527 |
| Tensile strength at break (MPa) | 17.1 | 17.6 | 17.3 | 18.8 | 17.9 | 17 | 17.6 |

Compatibility with Filling Compounds

Two compatibility tests were performed: weight increase and the influence on the mechanical properties.

Dumbbells 2 mm thick from pressed plaques were put in Insojell 3332 for 7 days. The samples were put on aluminum rods to enable free access for the petroleum jelly from all sides. The ageing was done at 70° C. The results are shown in Table 18.

Shrinkage 24 h shrinkage was measured at 23° C. and 100° C. The results are summarized in Table 17. The inventive examples show good shrinkage performance.

TABLE 17

Shrinkage behaviour

| | Ex 3 | Ex 4 | Ex 5 | CompEx 4 | CompEx 5 | CompEx 6 | CompEx 8 |
|---|---|---|---|---|---|---|---|
| Shrinkage 24 h 23° C. (%) | 0.15 | 0.0 | 0.0 | 0.0 | 0.00 | 0.0 | 0.0 |
| Shrinkage 24 h 100° C. (%) | 0.34 | 0.08 | 0.15 | 0.45 | 0.07 | 0.4 | 0.01 |

TABLE 18

Results from compatibility tests

| Jelly absorption | Ex 3 | Ex 4 | Ex 5 | CompEx 8 | CompEx 4 | CompEx 5 | CompEx 6 |
|---|---|---|---|---|---|---|---|
| Change in Elongation at break (%) | −5.6 | −2.9 | −3.7 | −12.2 | −9 | −8.8 | −0.8 |
| Stress at break (%) | −11.4 | −10.3 | −17.5 | −19.0 | −15.6 | −13.6 | −9.1 |
| Absorption weight increase (%) | 5.61 | 5.48 | 5.84 | 8.24 | 7.14 | 7.26 | 6.79 |

The materials prepared in a sequential multistage process (i.e. Ex 3-5 and CompEx 4, 5 and 8) have a more pronounced change in mechanical properties than the blend of LLDPE/LDPE. With regard to absorption weight increase, the inventive examples have the lowest values. Thus, considering both effects (i.e. change in mechanical properties as well as change in weight), the inventive materials offer the best compromise.

Heat deformation values are provided in Table 19.

TABLE 19

Heat deformation

| | Ex 3 | Ex 4 | Ex 5 | Comp 8 | Comp 4 | Comp 5 | Comp 6 |
|---|---|---|---|---|---|---|---|
| Heat deformation 4 h at 115° (%) | 14.9 | 13.1 | 10.6 | 10.9 | 15.4 | 14.6 | 65 |

Crystallization Temperature

In Table 20, crystallization temperatures of Ex 3-5 and CompEx 5 are listed.

TABLE 20

Crystallization temperature

| | Ex 1 | Ex 2 | Ex 3 | CompEx 5 |
|---|---|---|---|---|
| Crystallization temperature (° C.) | 112.7 | 112.9 | 113.3 | 111.6 |

The increase in crystallization temperature is beneficial for processing, e.g. for film applications, since the high molecular weight fraction (iii) acts as a nucleator increasing the crystallization. This is advantageous for the cooling properties after processing the article.

The invention claimed is:

1. A power or communications cable comprising an outer sheath layer made of a polyethylene composition comprising a base resin which comprises
   (A) a first ethylene homo- or copolymer fraction,
   (B) a second ethylene homo- or copolymer fraction, and
   (C) a third ethylene homo- or copolymer fraction in an amount of up to 20 wt % of the total base resin,
wherein fraction (A) has a lower molecular weight than fraction (B), and the base resin has a molecular weight distribution $M_w/M_n$ of more than 14, and fraction (C) has an MFR$_2$ of 0.1 g/10 min or lower.

2. Cable according to claim 1 wherein the base resin has a molecular weight distribution $M_w/M_n$ of 23 or more.

3. Cable according to claim 1 wherein the base resin has a MFR$_{21}$ of at least 90 g/10 min.

4. Cable according to claim 1 wherein the base resin has a MFR$_2$ of 0.05 to 5 g/10 min.

5. Cable according to claim 4 wherein the base resin has a MFR$_2$ of 0.5 to 1.2 g/10 mm.

6. Cable according to claim 1 wherein the base resin has a density of 0.915 to 0.960 g/cm$^3$.

7. Cable according to claim 6 wherein the base resin has a density of 0.918 to 0.928 g/cm$^3$.

8. Cable according to claim 1 wherein the base resin has a flow rate ratio FRR of 50 to 150.

9. Cable according to claim 8 wherein the base resin has a flow rate ratio FRR of 80 to 130.

10. Cable according to claim 1 wherein fraction (A) has a MFR$_2$ of 50 to 5000 g/10 min.

11. Cable according to claim 1 wherein fraction (A) has a density of 0.930 to 0.975 g/cm$^3$.

12. Cable according to claim 1 wherein fraction (A) is an ethylene copolymer with at least one further alpha-olefin.

13. Cable according to claim 1 wherein fraction (B) has a MFR$_2$ of 0.01 to 1 g/10 min.

14. Cable according to claim 1 wherein fraction (B) has a density of 0.880 to 0.930 g/cm$^3$.

15. Cable according to claim 1 wherein fraction (B) is a copolymer of ethylene with at least one further alpha-olefin.

16. Cable according to claim 1 wherein fraction (C) is present in the base resin in an amount of 1 wt % to 5 wt %.

17. Cable according to claim 1 wherein fraction (C) has a MFR$_{21}$ of less than 1 g/10 min.

18. Cable according to claim 1 wherein the weight ratio of fractions (A):(B) in the base resin is 40:60 to 60:40.

19. Cable according to claim 1 wherein the composition has a SHI$_{(2.7/210)}$ of 5 to 300.

20. Cable according to claim 1 wherein the base resin is an in-situ blend.

21. A polyethylene composition comprising a base resin which comprises
   (A) a first ethylene homo- or copolymer fraction,
   (B) a second ethylene homo- or copolymer fraction, and
   (C) a third ethylene homo- or copolymer fraction in an amount of up to 20 wt % of the total base resin,
wherein fraction (A) has a lower molecular weight than fraction (B), and the base resin has a molecular weight distribution $M_w/M_n$ of more than 14 and fraction (C) has a MFR$_2$ of 0.1 g/10 min or lower for the production of an outer sheath layer of a power or communication cable.

* * * * *